United States Patent
Lanoiselee et al.

(10) Patent No.: US 9,455,858 B2
(45) Date of Patent: Sep. 27, 2016

(54) METHOD FOR THE TRANSMISSION OF A MULTI-CARRIER SIGNAL, AND CORRESPONDING TRANSMISSION DEVICE AND COMPUTER PROGRAM

(71) Applicant: Orange, Paris (FR)

(72) Inventors: Marc Lanoiselee, La Chapelle des Fougeretz (FR); Bruno Jahan, Tinteniac (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 14/433,838

(22) PCT Filed: Sep. 30, 2013

(86) PCT No.: PCT/FR2013/052320
§ 371 (c)(1),
(2) Date: Apr. 6, 2015

(87) PCT Pub. No.: WO2014/053757
PCT Pub. Date: Apr. 10, 2014

(65) Prior Publication Data
US 2015/0271001 A1  Sep. 24, 2015

(30) Foreign Application Priority Data

Oct. 5, 2012 (FR) ........................... 12 59510
Mar. 8, 2013 (FR) ........................... 13 52116

(51) Int. Cl.
*H04L 27/26* (2006.01)
*H04L 25/03* (2006.01)

(52) U.S. Cl.
CPC ....... *H04L 27/2621* (2013.01); *H04L 27/2614* (2013.01)

(58) Field of Classification Search
CPC ............. H04L 5/023; H04L 27/2601; H04L 27/2623; H04L 27/2614; H04L 27/2621; H04L 27/2602; H04L 27/2617
See application file for complete search history.

(56) References Cited

U.S. PATENT DOCUMENTS 5,673,292 A * 9/1997 Carlin .................. H04H 20/26
                                                            329/348
6,757,299 B1   6/2004 Verma
(Continued)

FOREIGN PATENT DOCUMENTS

WO    WO 2010/138032 A1 * 12/2010 ............. H04L 27/26

OTHER PUBLICATIONS

International Search Report and Written Opinion dated Dec. 5, 2013 for corresponding International Application No. PCT/FR2013/052320, filed Sep. 30, 2013.
(Continued)

*Primary Examiner* — Chieh M Fan
*Assistant Examiner* — Michelle M Koeth
(74) *Attorney, Agent, or Firm* — David D. Brush; Westman Champlin & Koehler, P.A.

(57) ABSTRACT

A method is provided for transmission of an OFDM signal, wherein pre-transmission processing includes: mapping data representative of a source signal to complex symbols $X_n$, $0<=n<M$, belonging to a constellation; transforming M symbols $X_n$ into M corrected symbols $X'_n$, such that $X'_n = X_n + d_n$, wherein $d_n$ is a complex correction; and mapping M corrected symbols $X'_n$ to M from N carriers of an OFDM modulator to generate an OFDM signal, $M<=N$. The transformation includes initializing an accumulator, and, for each carrier of order n: accumulating at J samples of the n-order carrier mapped by $X'_n$; detecting a peak on the J samples accumulated at order n−1 and comparing the peak with the corresponding time sample of the n-order carrier delivering complex correction control information; and determining the correction value $d_n$ to obtain the corrected symbol $X'_n$ according to the correction control information.

10 Claims, 4 Drawing Sheets

(56) References Cited

U.S. PATENT DOCUMENTS

| | | | | |
|---|---|---|---|---|
| 2002/0168016 | A1* | 11/2002 | Wang | H04L 27/2624 375/260 |
| 2007/0140367 | A1 | 6/2007 | Braithwaite | |
| 2011/0075745 | A1* | 3/2011 | Kleider | H04L 25/03057 375/260 |
| 2012/0257690 | A1* | 10/2012 | Li | H04L 27/2618 375/296 |
| 2012/0294346 | A1* | 11/2012 | Kolze | H04L 27/3411 375/224 |
| 2013/0315320 | A1* | 11/2013 | McGowan | H04L 27/2614 375/260 |

OTHER PUBLICATIONS

Leonard J. Cimini, Jr. et al., "Peak-to-Average Power Ratio Reduction of an OFDM Signal Using Partial Transmit Sequences", IEEE Communications Letters, IEEE Service Center, Piscataway, NJ, US, vol. 4, No. 3, Mar. 1, 2000, pp. 86-88, XP011083857.

Yan Xin et al., "Low Complexity PTS Approaches for PAPR Reduction of OFDM Signals", Communications, 2005. ICC 2005. 2005 IEEE International Conference on Seoul, Korea May 16-20, 2005, Piscataway, NJ, USA, IEEE, vol. 3, May 16, 2005, pp. 1991-1995, XP010826220.

Wang et al., "Optimized Iterative Clipping and Filtering for PAPR Reduction of OFDM Signals", IEEE Transactions on communications, vol. 59, No. 1, pp. 33-37, Jan. 2011.

\* cited by examiner

METHOD FOR THE TRANSMISSION OF A MULTI-CARRIER SIGNAL, AND CORRESPONDING TRANSMISSION DEVICE AND COMPUTER PROGRAM

1. CROSS-REFERENCE TO RELATED APPLICATIONS

This application is a Section 371 National Stage application of International Application No. PCT/FR2013/052320, filed Sep. 30, 2013, the content of which is incorporated herein by reference in its entirety, and published as WO 2014/053757 on Apr. 10, 2014, not in English.

2. FIELD OF THE INVENTION

The field of the invention is that of the radiofrequency communications for which a multicarrier modulation, notably of OFDM (Orthogonal Frequency Division Multiplexing) type is used.

More specifically, the OFDM modulation is increasingly being used for digital transmission, particularly on transmission channels with multiple paths. This multicarrier modulation technique makes it possible notably to be rid of the interference between symbols generally observed when using a single-carrier modulation on a multiple-path channel. Furthermore, this technique offers a very good spectral efficiency and makes it possible to save on radio spectral resources by the implementation of single-frequency networks.

Because of the robustness intrinsic to the multiple-path channels and to the frequency-selective channels, the OFDM modulation is used notably, but not exclusively, in wireless (WiFi) local area networks, 3GPP LTE ("3rd Generation Partnership Project" and "Long Term Evolution") cellular mobile radiotelephony, or even ADSL (Asymmetric Digital Subscriber Line), but also for standards such as those relating to digital audio broadcasting (DAB), digital TV broadcasting, notably including DVB-T (Digital Video Broadcasting—Terrestrial) or even the new DVB-T2 standard.

3. PRIOR ART

3.1 Drawbacks of OFDM Modulation

A major drawback in the OFDM technique is inherent to the strong amplitude fluctuations of the envelope of the modulated signal and therefore to the significant variations of the instantaneous power.

In effect, in the time domain, the summing of these multiple carriers modulated independently is performed in terms of power most of the time, but also coherently which results in instantaneous power peaks which can exceed by more than 10 dB the average power of the signal at certain instants.

The peak to average power ratio (PAPR) of the transmitted signals, in other words the factor which characterizes the level of these power peaks relative to the average power of the signal, is thus generally very high and it increases with the number of carriers N.

The power amplifiers have nonlinear characteristics which, coupled with the amplification of the so-called strong PAPR signals, lead to distortions: spectral raising of the level of the secondary lobes, generation of harmonics, creation of interferences between nonlinear symbols, creation of interferences between carriers. Thus, these distortions notably result in transmission errors and a degradation of the bit error ratio (BER).

3.2 Definition of PAPR

More specifically, according to a particular embodiment, a band B OFDM signal is used that consists of the sum of N regularly modulated orthogonal carriers spaced apart by a frequency interval $\Delta f$ such that: $B=N\cdot\Delta f$. For a given OFDM block, each carrier is modulated by a symbol $X_n$ belonging to a constellation (QPSK, QAM16, etc.). The inverse Fourier transform (IFFT) of the band B frequency signal then supplies, in the time domain, the signal x(t), which will be transmitted. In the time domain, the duration of an OFDM block is $N\cdot Te=1/\Delta f$, with Te being the sampling period, and is expressed as follows:

$$x(t) = \frac{1}{\sqrt{N}} \cdot \sum_{n=0}^{N-1} X_n \cdot e^{j\cdot 2\pi\cdot n\cdot \Delta\cdot f\cdot t}, \, 0 \leq t < N\cdot Te$$

Assuming that the variables $X_n$ are random, statistically independent and centered, the PAPR of the OFDM signal is deduced therefrom, expressed as:

$$PAPR = \frac{\max_{0 \leq t < N\cdot Te} \cdot |x(t)|^2}{E\cdot [|x(t)|^2]}$$

It is observed that, with this definition of the PAPR, and x(t) being the IFFT of discrete random variables, the PAPR can become as great as N in the particular but also very rare case in which $\{X_k\}_{k=0}^{N-1}=1$.

In practice, the PAPR peaks of a given amplitude occur to a certain probability of appearance. It is notably improbable for the amplitude of the signal to be as great as N, and all the more so as N becomes greater. Also, conventionally, to characterize the PAPR of an OFDM system, the complementary cumulative distribution function (CCDF) is used, which supplies the probability of the amplitude of the signal exceeding a certain threshold. This function is the one used most to characterize the PAPR reduction systems and is expressed as follows:

$$CCDF_{PAPR} = Pr[PAPR(X_L) > \gamma, L = 1] \approx 1 - (1 - e^{-\gamma})^N$$

In practice, this equation indicates, for example, that the signal will not be able to be correctly transmitted without sample saturation of at least one symbol in one hundred with a signal comprising 2048 carriers if the digital/analog and/or analog/digital converters and the power amplifiers to not work with a dynamic difference between average power and peak power of at least 12.2 dB, which represents, for the amplifier, an operating power ratio of 1 to 16.

Below this margin, the signal will be clipped or at the very least greatly distorted with repercussions on the transmission and reception conditions.

3.3 Prior Art for PAPR Reduction

In the literature, numerous techniques have already been proposed to mitigate this problem.

One current solution consists in ensuring that the operating range of the amplifier remains limited to a linear amplification zone, which unfortunately limits the range of the amplifier (a few % instead of, conventionally, 50%) and therefore results in a significant increase in the consumption of the transmitter. This is a very strong constraint for the use of OFDM notably in mobile terminals, bearing in mind that the consumption of the power amplifier can represent more than 50% of the total consumption of a terminal.

A second approach is the application of a constraint or coding to the sequence of data transmitted to limit the PAPR. This method consists in constructing a set of code words which minimizes the PAPR. A number of techniques for constructing these codes have been proposed. The advantage of this solution lies in the fact that it does not introduce any distortion. On the other hand, the spectral efficiency is penalized without even providing any coding gain. Furthermore, to date, its scope of application is limited to the OFDM modulators with small numbers of carriers N because of an excessively great computation complexity.

A third approach, commonly called "TI-CES (Tone Injection—Constellation Extension Scheme) technique", proposes increasing the number of points of the constellations which modulate the OFDM carriers so that, for a point of the original constellation, there can be several corresponding possibilities of coordinates in the new constellation. According to this approach, this additional degree of freedom is used to generate a signal of lower PAPR. However, this method presents a number of drawbacks in that the constellation extension will lead to an increase in the average power of the signal since the additional symbols have higher power levels. Furthermore, the selection of the best possibility of coordinates for each point requires the complexity of the computation implemented to be increased, rendering it unsuitable to a hardware implementation for real-time signal processing.

A fourth approach, commonly called "CD (Constellation Distortion) technique", is also based on a constellation modification and relies on the assumption whereby the output level of the transmission amplification is limited by the strongest PAPR peaks and if the amplitude of these peaks can be reduced then the transmitted power can be increased. According to this technique, for a given distortion rate, one problem of optimization, called convex, is resolved in order to generate an OFDM signal with a minimum overall PAPR level. However, this method entails very significantly increasing the average output power to neutralize the loss in terms of signal-to-noise ratio. Furthermore, the computation complexity implemented exponentially increases when the constellation order becomes high.

A fifth technique, commonly called "ACE (Active Constellation Extension) technique", is also based on a constellation modification and relies on a displacement performed in the direction away from the decision axes. However, in the same way as for the preceding two methods, this technique is characterized by a lesser efficiency for high order constellations through the increase in the average power of the signal, and through the very high computation complexity.

A sixth method, commonly called "TR (Tone Reservation) technique", proposes reserving certain carriers of the OFDM multiplex, which do not convey information but transmission-optimized symbols to reduce the PAPR. The optimization of these symbols can be performed by using, for example, a convex optimization algorithm of SOCP (Second Order Cone Programming) type. Just like the preceding method, this solution does not add any distortion to the transmitted signal, but a major drawback of this method lies in the fact that a certain number of carriers have to be reserved to be able to significantly reduce the PAPR. These carriers are not used to transmit useful information data, which leads to a reduction of the spectral efficiency.

A seventh technique, called "Selected Mapping", consists in applying a phase rotation to each symbol of the sequence to be transmitted. A number of phase rotation patterns can be defined. For each pattern applied to the sequence to be transmitted, the operations are performed to obtain a corresponding OFDM signal, and the one exhibiting the lowest PAPR is transmitted. Once again, this technique does not add any distortion, but it entails communicating to the receiver the rotation sequence used in transmission with very high reliability, which leads to a reduction of the spectral efficiency and a significant increase in the complexity of the system to route the rotation pattern applied via a dedicated channel. Furthermore, if this transmission is errored, the entire OFDM frame will be lost. It also increases the transmission complexity, since a number of processing operations have to be performed in parallel, to then choose the most effective. The other processing operations have been performed pointlessly, and are not used.

A final approach is the "clipping", or limiting, technique, which consists in clipping the amplitude of the signal when it exceeds a predefined threshold. However, this clipping is intrinsically nonlinear and introduces a distortion of the transmitted signal which is reflected not only in a degraded BER but also in a raising of the secondary lobes of the PSD (Power Spectral Density).

In this particular context, the inventors have therefore identified a need for a novel technique that makes it possible to improve the reduction of the PAPR while remaining simple to implement.

4. SUMMARY

An aspect of the present disclosure relates to a method for transmitting an OFDM signal, the processing of which before transmission comprises:
  a mapping of data representative of a source signal on complex symbols $X_n$, $0 \leq n < M$, belonging to a constellation, n and M being integers,
  a transformation of M symbols $X_n$ into M corrected symbols $X'_n$, such that $X'_n = X_n + d_n$, with $d_n$ being a complex correction,
  a mapping of the M corrected symbols $X'_n$ on N carriers of an OFDM modulator to generate the OFDM signal, N being an integer, $M \leq N$,
  The transformation comprises:
  a step of initialization of an accumulator and
comprises, for each carrier of order n, n ranging from 1 to M−1:
  a step of accumulation in the accumulator respectively with J samples already present of J temporal samples corresponding to the J samples of the carrier of order n mapped by $X'_n$, J being an integer,
  a step of detection of a peak on the J samples resulting from the step of accumulation to the order n−1 and of comparison of this peak with the coinciding temporal sample out of J temporal samples of the carrier of order n delivering a complex correction control information item,
  a correction step determining the complex correction value $d_n$ to obtain the corrected symbol $X'_n$ as a function of the complex correction control information item.

The invention also relates to a device for transmitting an OFDM signal. According to the invention, the transmission device comprises:

a mapping module for mapping data representative of a source signal on complex symbols Xn, 0≤n<M, belonging to a constellation, n and M being integers, a transformation module for transforming M symbols Xn into M corrected symbols X'n, such that X'n=Xn+dn, with dn being a complex correction, an OFDM modulator with N carriers to generate the OFDM signal from the M corrected symbols X'n mapped on M carriers, M being an integer, M≤N and N−M carriers not being mapped when M≠N.

The transformation module comprises:

a construction and accumulation module for accumulating J temporal samples corresponding to the J samples of a current carrier of order n mapped by X'n to J samples already present, 1≤J, a module for detecting a peak on the J samples at the output of the construction and accumulation module to the order n−1 and for comparing this peak with the coinciding temporal sample out of J temporal samples of the current carrier of order n delivering a complex correction control information item, a correction module determining the complex correction value dn to obtain the corrected symbol X'n as a function of the complex correction control information item.

Such a transmission device is notably suitable for implementing the transmission method according to the invention.

Thus, the invention rests on a novel and inventive approach to reducing the PAPR of an OFDM signal.

More specifically, the present invention makes it possible to improve the PAPR reduction performance levels with a low computation complexity compared to the prior art techniques.

Furthermore, the present invention offers great constellation modification flexibility compared to the constellation modifications imposed by the TI-CES, CD, ACE and TR techniques.

In effect, the method according to the invention modifies, in succession and in a controlled manner, the symbols of constellations modulating the carriers of an OFDM block in the frequency domain before a frequency-time transform is implemented.

According to a particular embodiment, the frequency-time transform is a discrete inverse Fourier transform. According to a particular embodiment, the inverse Fourier transform is a fast transform (IFFT). Hereinbelow, the acronym IFFT denotes the frequency-time transform implemented by the OFDM modulator that makes it possible to generate the OFDM signal.

The invention uses, for the PAPR reduction, a real-time slaving of the correction of a carrier, called current carrier, relative to the previously corrected carriers of a same OFDM block. "Correction of a carrier n" should be understood to mean a correction of the symbol Xn by the value dn to give the symbol X'n which maps this carrier n in the OFDM modulation performed by the OFDM modulator.

This slaving is notably based on the implementation, to correct the constellation symbol modulating a current carrier, of a detection of a PAPR peak out of a set of temporal samples representative of the sum of the temporal responses of the previously corrected carriers.

Then, by taking into account the temporal sample of the carrier that is to be corrected which coincides in time with the duly detected peak, a complex correction control information item is obtained. This complex correction control information item is then used to determine the correction to be made to the complex coordinates of the constellation symbol modulating the current carrier that is to be corrected.

Thus, on completion of the accumulation, detection and correction steps mentioned above implemented for each of the M mapped carriers, the method performs the "pre-construction", in the frequency domain, that is to say before the frequency-time transform, of the corrected temporal signal consisting of J samples and associated with an OFDM block of N carriers mapped by the M corresponding symbols (M≤N).

To this end, the transformation constructs, in parallel, the J temporal samples corresponding to the J samples of the carrier of order n−1 mapped by $X'_{n-1}$ and accumulates these J samples in the accumulator. This accumulation amounts to adding these J samples respectively to the J samples already present in the accumulator. The transformation detects, after each accumulation, the appearance of a PAPR peak out of the J samples accumulated. Moreover, the transformation constructs in parallel the J temporal samples corresponding to the current carrier of order n. The transformation compares the PAPR peak detected out of the J samples resulting from the accumulation to the order n−1 with the temporal sample, out of the J temporal samples of the current carrier of order n, positioned with the same index in the block of size J. The transformation determines a complex correction control information item which makes it possible to determine a complex correction value. In particular, if the peak and the temporal sample have respective amplitudes and phases which will lead to an amplification of the peak after accumulation to the order n, the complex correction value is determined to oppose the amplification effect.

According to a particular implementation feature, the method develops the computation of an inverse discrete Fourier transform of a block of N carriers, of which M carriers are mapped by the symbols X'n by performing the computation carrier after carrier and for a given carrier n mapped by X'n, by computing each temporal sample I, I varying between 0 and J−1. The method thus determines the temporal samples associated with a carrier mapped by X'n. The accumulation then consists in adding the J temporal samples of the current carrier n respectively to the J preceding samples already accumulated concerning the carriers to the order n−1.

It should be noted that the frequency-time transform which is generally an inverse Fourier transform can be applied to a number M of carriers mapped by the M symbols considered, less than N, the number of carriers of the OFDM modulator. In effect, it is common practice to reserve carriers to insert pilots therein, to limit the problems of spectrum overlap by setting the edge carriers to zero, to avoid a continuous component by setting the central carrier to zero.

It should be noted that the term "pre-construction" means that even when in the frequency domain, the temporal samples of the response of the signal which "could" be obtained after IFFT are determined. In effect, the invention aims to correct the complex coordinates of the constellation symbol modulating a current carrier in the frequency domain.

Thus, the term "preconstructed" is associated with the temporal samples possibly corrected before the implementation of the OFDM modulator.

"Complex" should be understood to mean "which can have a real and/or imaginary value such that this value is for example defined by v=a+jb".

Such a method therefore culminates in an overall correction of the OFDM temporal signal by virtue of the fact that each carrier of an OFDM block can be corrected.

The correction of the temporal signal is optimized by virtue of the fact that the complex displacement of constellation coordinates is determined as a function of a complex correction control information item. As described hereinbelow, such a dependency between the complex displacement of constellation coordinates and the complex correction control information item makes it possible to construct a new constellation. This new constellation can correspond, for example and in a particular manner, to a modified constellation or to a combination of the constellations deriving from the constellation modification techniques previously cited, namely the TI-CES, CD, ACE and TR techniques.

In this configuration, one advantage of the technique proposed according to the invention is therefore to be able to increase efficiency by making it possible to associate a number of constellation modification techniques, the distinct respective defects of which can be neutralized to a certain extent by virtue of the correction control based on the implementation of a real-time slaving between a current carrier to be corrected and the carriers which precede it in time and which have been previously corrected.

According to a particular aspect of the invention, the step of detection on the J samples resulting from the step of accumulation to the order n is implemented in relation to a step of generation of the J temporal samples associated with the current carrier of index n with a delay of predetermined duration corresponding to a clock cycle.

The implementation of this delay according to a predetermined clock cycle notably makes it possible to synchronize the obtaining of the complex correction control information item in order for it to be delivered just at the moment when the step of correction of the constellation symbol modulating the current carrier of order n to be corrected takes place, making it possible to obtain X'n which occurs in the step of accumulation to the order n+1.

Preferentially, the detected peak is a power peak, the J temporal samples of the carrier of order n are complex and the complex correction control information item belongs to at least one of the following categories:
  complex correction control information item, of which the real, respectively imaginary, part is positive when the sign of the peak and of the real, respectively imaginary, part of the corresponding complex temporal sample are identical,
  complex correction control information item of which the real, respectively imaginary, part is negative when the sign of the peak and of the real, respectively imaginary, part of the corresponding complex temporal sample are opposite,
  complex correction control information item of which the real, respectively imaginary, part is zero when the power amplitude of the temporal sample of the corresponding detected peak is below a predetermined threshold, or when said current carrier of index n is said to be "reserved" and should not be corrected, for example in the case where the insertion of pilot symbols occurs before the implementation of the method according to the invention.

Thus, the complex correction control information item makes it possible to control the reduction of the PAPR peak by taking into account the sign correlation between the peak of the preconstructed temporal samples representative of the carriers previously corrected and accumulated and the complex temporal sample of the current carrier to be corrected coinciding in time with the detected peak.

It is therefore possible to control the correction implemented from one carrier to another in an optimized manner, by taking into account the correlation between a current carrier to be corrected and the peak detected from the accumulation of the carriers previously corrected, or by taking into account the identification of carriers said to be "reserved", the constellation symbol of which must remain constant. It is therefore possible, according to a particular aspect of the invention, for no correction to be made to predetermined or previously identified "reserved" carriers.

Advantageously, the correction step implements a summing of the coordinates of the constellation symbol with coordinates representative of a complex displacement of the constellation symbol on the X and Y axes of the complex plane of the constellation of this symbol, the complex displacement being selected by means of the complex correction control information item, out of the complex displacements belonging to at least one of the following categories:
  real, respectively imaginary, displacement of the complex displacement, negative when the complex correction control information item comprises a positive real, respectively imaginary, part;
  real, respectively imaginary, displacement of the complex displacement, positive when the complex correction control information item comprises a negative real, respectively imaginary, part;
  real, respectively imaginary, displacement of the complex displacement, zero when the complex correction control information item comprises a zero real, respectively imaginary, part.

"Real displacement of the complex displacement" should be understood to mean the displacement along the real axis of the real part of the complex displacement. "Imaginary displacement of the complex displacement" should be understood to mean the displacement along the imaginary axis of the imaginary part of the complex displacement. In effect, the displacements of the real part and of the imaginary part of the constellation symbol are independent of one another. For example, the real part of the constellation symbol can be displaced positively with respect to the axis of the real numbers while the imaginary part can be displaced negatively with respect to the axis of the imaginary numbers.

Thus, the invention proposes a control of the complex displacement of each constellation symbol modulating a carrier on the X and Y axes of the complex plane of the constellation of this symbol. A controlled complex displacement of the constellation symbols is therefore obtained which can be distinct from one constellation symbol modulating a carrier to another constellation symbol modulating another carrier.

In other words, it is for example possible for the real and/or imaginary components of the constellation symbol modulating a carrier of index n+g, with g being an integer such that $0 \leq n+g \leq N-1$, to be corrected according to a complex displacement with a positive real, respectively imaginary, part, while the real, respectively imaginary, component of the constellation symbol modulating the carrier of index n is corrected according to a complex displacement with a negative real, respectively imaginary, part.

Since the nature of the complex displacement is controlled, the complex displacements implemented can result in the constellation points being retained in their decision sector or in the original constellation when a mapping correction of CD type is chosen for example, or else in them being displaced outside when a correction of ACE or CES type is chosen according to another exemplary correction.

Furthermore, the zero complex displacements result in points of the original constellation being retained, in other words without correction.

According to a particular aspect of the invention, the absolute value of the real, respectively imaginary, part of the complex displacement is fixed from one carrier to another of the OFDM block and this absolute value corresponds to a predetermined value. For example, this complex displacement value is equal to 0.25 or 0.5 times the distance from the constellation point to the boundary of the decision sector.

The constancy of the absolute value of the real, respectively imaginary, part of the complex displacement notably makes it possible to limit the complexity of implementation of the invention.

According to one embodiment, the method according to the invention constructs J=L·N temporal samples with L being an integer greater than or equal to 1. When L=1 then J=N. When L>1, for example when L=2 or 4, there is oversampling. Such oversampling advantageously makes it possible to obtain a greater resolution in the PAPR reduction.

According to a particular embodiment, the transmission method successively implements at least the following sub-steps:
  application of an inverse fast Fourier transform to the real and imaginary components of the constellation symbol, centered on a frequency equal to Fe/2,
  transposition of the real and imaginary components into baseband,
  oversampling by a factor L, with L=2 for example, at a frequency equal to 2·Fe of the real and imaginary components in baseband,
  low-pass filtering of the real and imaginary components,
  modulation of said components with a carrier frequency at Fe/2.

More particularly, the method according to the invention implements the following equation:

$$S\left(l \cdot \frac{Te}{2}\right) = \sum_{n=0}^{N-1} \left[A_n \cos\left(\pi \cdot l \cdot \frac{n}{N}\right) - B_n \sin\left(\pi \cdot l \cdot \frac{n}{N}\right)\right]$$

with:
  $A_n$ and $B_n$ being the real and imaginary components of the constellation symbol modulating said current carrier of index n,
  S being all the preconstructed real temporal samples relating to an OFDM block, $$Te = \frac{1}{Fe} \text{ and } 0 \le l < J = L \cdot N = 2 \cdot N.$$

According to one embodiment of the device, the detection module detects a maximum power peak.

According to one embodiment of the device, the transformation module further comprises:
  a module for generating the J temporal samples associated with the current carrier of index n, 0≤n<M,
and the construction and accumulation module comprises:
  a module for constructing the J temporal samples of the current carrier of order n mapped by X'n and
  an accumulation module.

The invention relates also a computer program comprising instructions for implementing a transmission method described above when this program is executed by a processor.

5. LIST OF FIGURES

Other features and advantages of the invention will become more clearly apparent on reading the following description of a particular embodiment, given as a purely illustrative and nonlimiting example, and the attached drawings, in which:

FIGS. 1A and 1B respectively represent the processing scheme for an OFDM signal and a simplified block diagram of the PAPR reduction system according to the invention;

6. DESCRIPTION OF AN EMBODIMENT OF THE INVENTION

6.1 General Principle

Figure 1A:
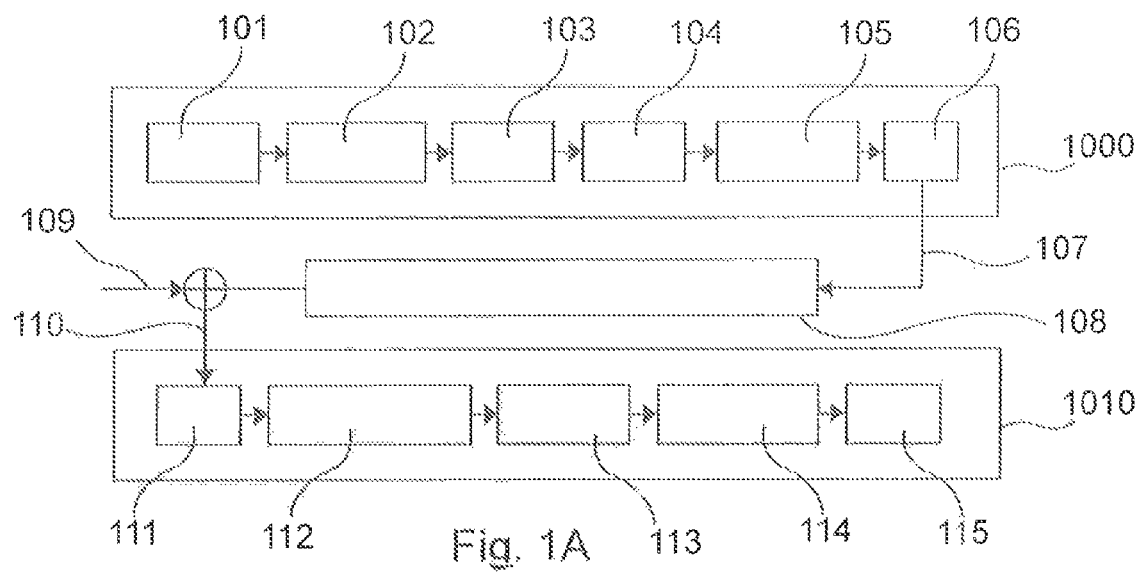

The invention therefore relies on the use of a control of correction of the constellation modulating an OFDM signal so as to optimally reduce the peak-to-average power ratio, or PAPR.

More specifically, the invention implements a "pre-construction" of a corrected real digital signal representative of the signal obtained at the output of the transmission device for which the PAPR is reduced.

During the "pre-construction" of the digital signal, carrier by carrier, the method according to the invention detects PAPR peaks. In the presence of these peaks, the method according to the invention delivers a complex correction control information item that makes it possible to optimize the modification of the constellation associated with the carriers of the OFDM signal in order to reduce these peaks.

In particular, the control information item is obtained by taking into account both the current carrier to be corrected and carriers previously corrected. The invention therefore makes it possible to adapt, carrier by carrier, the constellation of the signal to be transmitted.

New signal modulation constellations that allow for a reduction of the PAPR are therefore obtained according to the invention.

An exemplary scheme for processing an OFDM signal for the purpose of reducing the PAPR is described hereinbelow in relation to FIG. 1A. An OFDM signal is, according to the embodiment illustrated by FIG. 1A, processed according to a succession of steps:
on transmission by the transmitter 1000:
  generation 101 of source data;
  coding and interleaving 102 of said data delivering interleaved data;
  modulation of said interleaved data 103 for example according to a QAM modulation consisting in mapping the interleaved data representative of the source signal on complex symbols Xn belonging to the constellation;

insertion 104 of pilot carriers;

correction 105 of the symbols of an OFDM block for the purpose of reducing the PAPR according to the method of the invention;

OFDM modulation 106 for example implementing an inverse fast Fourier transform (IFFT) delivering OFDM symbols, this modulation consists in mapping the corrected symbols on the carriers of an OFDM modulator to generate the OFDM signal;

transmission 107 of said OFDM signal over a transmission channel 108, this transmission generally being accompanied by noise, for example a Gaussian white noise 109;

and on reception by the receiver 1010:

reception 110 of a so-called received signal;

OFDM demodulation 111 of said received signal implementing, according to a particular embodiment, a fast Fourier transform (FFT) delivering a transformed received signal;

channel estimation 112;

demodulation 113 of said transformed received signal delivering a demodulated signal;

de-interleaving and decoding 114 of said demodulated signal;

determination of the bit error rate.

The invention therefore proposes a specific correction technique 105 which makes it possible to effectively reduce the PAPR while being simple to implement. Furthermore, the correction according to the invention is implemented only in transmission and does not require any modifications to the existing receivers.

According to the illustration of FIG. 1A, the transmission method according to the invention takes place after the insertion 104 of pilot carriers. This insertion can, according to other embodiments, take place in a manner interleaved with the steps of the method according to the invention or succeeding the steps of the method according to the invention. To simplify the description, it is considered that the method according to the invention takes into account a block of N symbols, the size of which is equal to the total number N of carriers of the OFDM modulator (therefore M=N). The block of M symbols can equally be less than N to take account of reserved carriers and the value of which is set elsewhere, or else of unmodulated carriers on the edges of the spectrum.

Figure 1B:
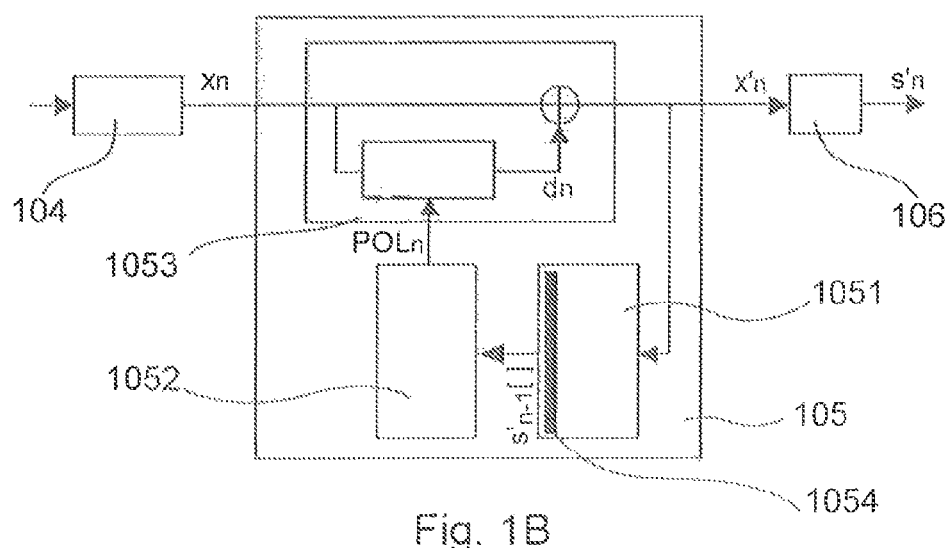

The PAPR reduction method 105 according to the invention is described according to the block diagram of FIG. 1B. More specifically, the main steps of the transmission method according to the invention are implemented in the frequency domain between the conventional steps of modulation 103 and of OFDM modulation 106 for example implementing an inverse fast Fourier transform IFFT.

More specifically, according to FIG. 1B, the method according to the invention corresponds to a slaving system of retroactive type ("Feed-Back" type).

In particular, this method operates in real time according to a clock timing at a frequency Fe, for example the sampling frequency of the source data. Furthermore, this method is non-iterative, in other words a correction relating to a block of N carriers (N corresponding equally to the size of the Fourier transform and of the inverse Fourier transform) is entirely computed in a duration of N samples at the frequency Fe.

The method consists in "preconstructing", using a construction and accumulation module 1051, a detection and comparison module 1052 and a correction module 1053 represented in FIG. 1B, before inverse fast Fourier transform (IFFT) 106, the real temporal signal which could be obtained at the output of the transmission device from the series of the different carriers of an OFDM signal block which are modulated by constellation symbols.

For each carrier of the OFDM modulator modulated by a symbol Xn, the construction and accumulation module 1051 simultaneously computes all the J samples of the temporal response of this carrier mapped by the symbol X'n which could be obtained after inverse Fourier transform implemented by the OFDM modulator, if this carrier were transformed in the time domain in isolation. Then, from carrier to carrier, the different temporal responses are accumulated by the construction and accumulation module 1051 up to the current carrier of order N−1.

At the order n, the signal vector S'n−1[ ] at the output of the construction and accumulation module consists of the temporal samples computed in parallel for the corrected carriers up to the order n−1, with n>1 and for the uncorrected carrier of index 0 mapped by $X_0$. At the end of the construction by accumulation, the temporal samples at the output of the construction and accumulation module 1051 correspond to the J serial samples of the temporal signal S'(t) obtained at the output of the transmission device over the duration of the OFDM block.

From the start of an OFDM block, the vector S'n−1[ ] of the temporal samples is therefore constructed progressively on each clock and accumulation cycle. Then, the vector S'n−1[ ] is used by the detection and comparison module 1052 to detect the appearance of a power peak on a sample of the vector. By comparison with the temporal sample with the peak, out of the samples of the temporal response of the current carrier n, the detection and comparison module 1052 deduces therefrom a correction control information item POLn corresponding to an information item representative of the polarity of the detected peak.

The correction module 1053 determines a correction dn of the constellation from this correction control information item POLn, as illustrated hereinbelow according to the examples of FIGS. 5A to 5C.

The control information item POLn, computed at the index n from S'n−1[ ], comprises a delay clock cycle, represented by a black vertical bar 1054, relative to the symbol Xn which will be corrected to X'n by this control information item POLn and accumulated on the next clock pulse. In effect an accounting registered at the frequency Fe is performed at the output of the construction and accumulation module 1051. Thus, on each edge of this clock, a new input, namely a corrected constellation symbol X'n, is loaded and a new output is updated and corresponds to the temporal samples of the carrier n mapped by the corrected constellation symbol X'n respectively accumulated with the samples already accumulated to the preceding orders. The corresponding values of the temporal samples are then kept at the output during a clock cycle.

Based on the complex control information item POLn, the correction module 1053 applies a constellation correction modifying the coordinates of the constellation symbol Xn by imposing a complex displacement dn thereon.

Such a complex displacement dn has the effect, in the next accumulation step, of reducing the amplitude of the detected peak relative to what it might have been without correction. This accumulation will therefore produce a new value S'n[ ], of the series of the temporal samples preconstructed in parallel, with a regression constraint on the sample with the highest level.

The method according to the invention is then reproduced on each new constellation symbol. As the carriers are corrected, new peaks to be corrected can appear and are corrected. The method according to the invention is terminated at the end of a current OFDM block once all its constituent carriers have been scanned.

The construction and accumulation module 1051 is then reinitialized to process the next OFDM block.

Figure 2:
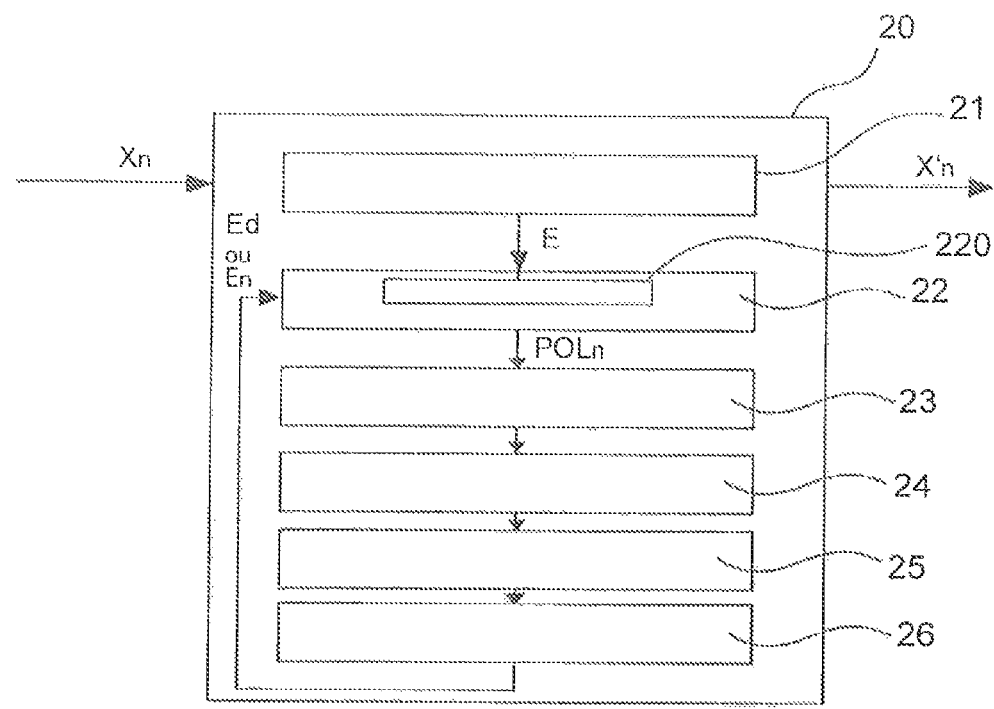
FIG. 2 illustrates the main steps of a transmission method according to one embodiment of the invention.
Figure 3:
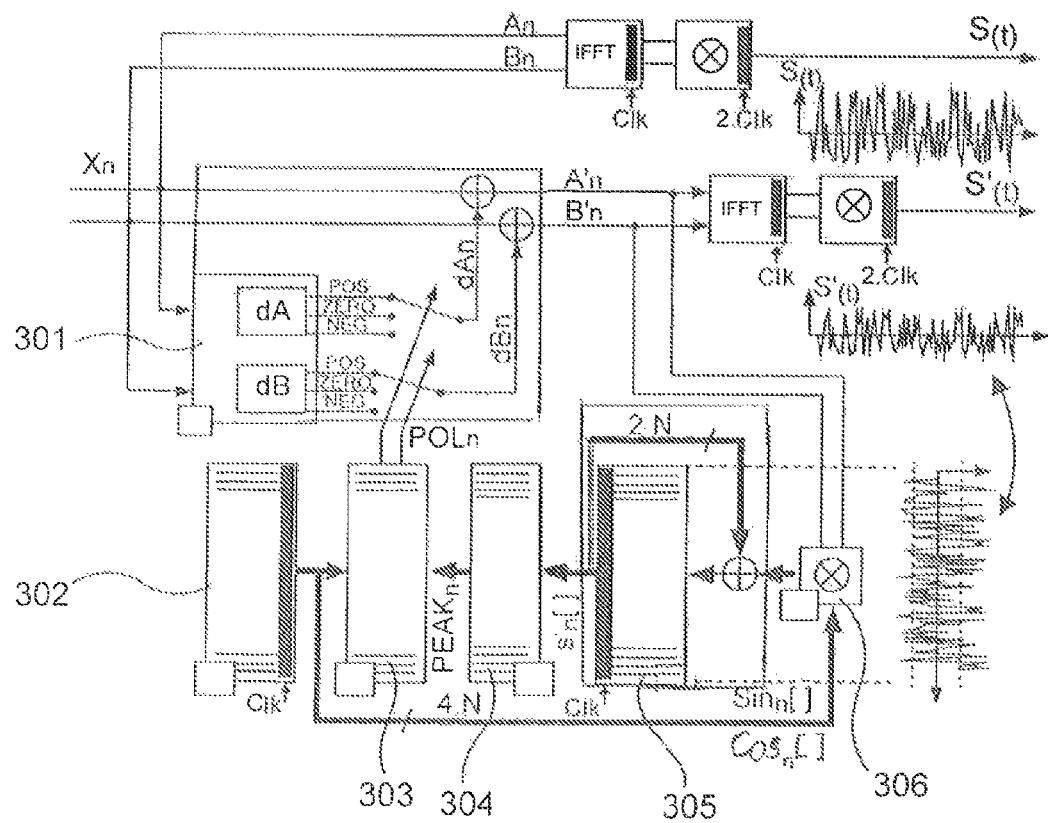
FIG. 3 illustrates a detailed block diagram of the PAPR reduction system according to one embodiment of the invention.

6.2 Detailed Description and Implementation of the Different Steps of the Transmission Method According to the Invention FIG. 2 represents in detail the steps implemented according to an embodiment of the invention in order to generate a correction of the constellation which modulates each carrier of an OFDM block and to do so in order to reduce the PAPR of the transmitted signal whereas FIG. 3 represents an exemplary physical implementation of these steps.

These two aspects are detailed hereinbelow.

Figure 4A:
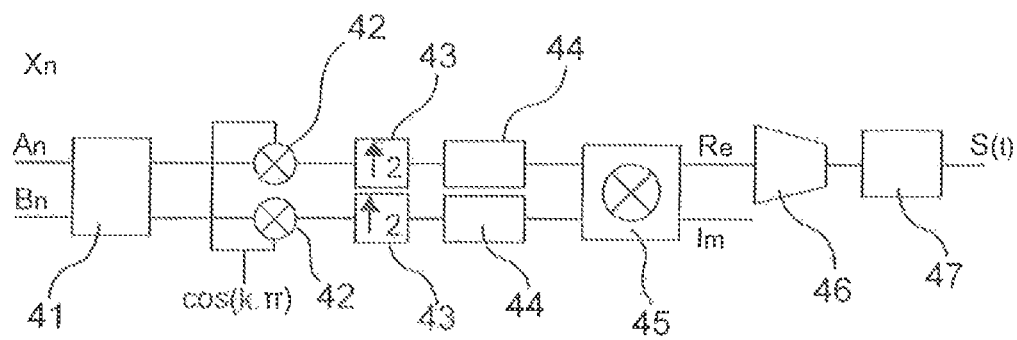
FIGS. 4A and 4B illustrate the different computation sub-steps implemented by the method according to the invention.
Figure 4B:
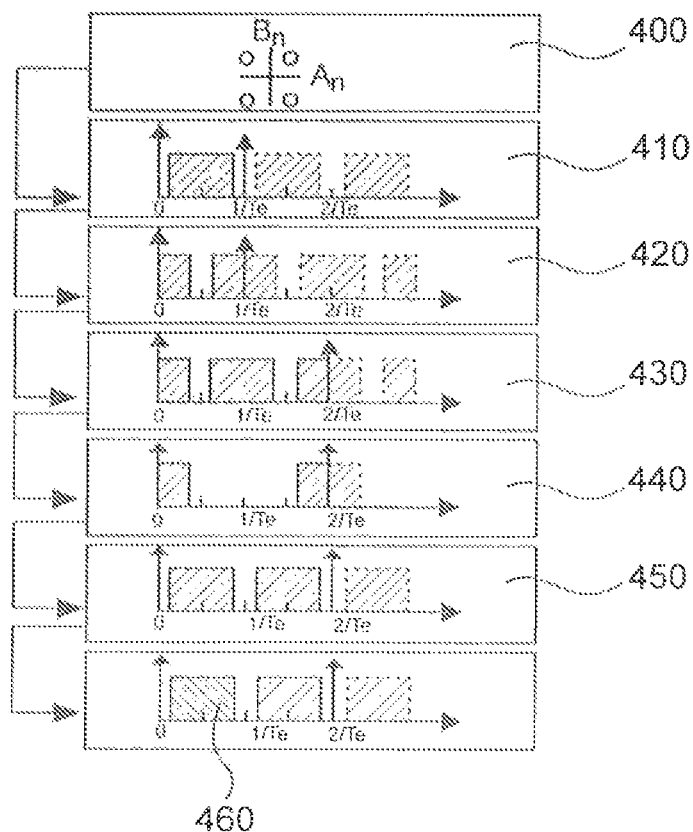

6.2.1 Description of the Different Steps of the Method According to the Invention The method according to the invention performs, for each carrier modulated by a constellation symbol, a processing operation equivalent to that comprising, in succession, at least the sub-steps represented in relation to FIGS. 4A and 4B.

In effect, the PAPR reduction has to be applied to the temporal signal which "would be" transmitted without correction at the output of the OFDM transmission device.

From a series of the constellation symbols which modulate the carriers, each constellation system Xn being defined by a pair of values 400 (An, Bn) which define the coordinates of the constellation symbol Xn in the complex plane such that $X_n = A_n + j \cdot B_n$, the method according to the invention preconstructs a real digital signal representative of the radiofrequency analog signal which will be obtained at the output of the transmission device.

To do this, according to the method according to the invention, the implementation of a frequency-time transform, considered for illustration purposes as being an inverse fast Fourier transform (IFFT) (41), on the real (An) and imaginary (Bn) components of each constellation symbol Xn respectively modulating each of the N carriers of an OFDM block considered, n being an integer such that $0 \leq n \leq N-1$, is first of all considered. In effect, it is considered that M=N and that certain carriers out of the N carriers can be reserved.

There is then obtained the representation 410 of the signal in FIG. 4B and the following expression at the output of the IFFT at $t = k \cdot Te$, with $0 < k < K = N$ and $K \cdot Te = T$, the duration of the OFDM block considered:

$$x(k \cdot Te) = \sum_{n=0}^{N-1} X_n \cdot e^{2 \cdot j \cdot \pi \cdot \frac{n}{T} \cdot k \cdot Te}$$

Then, a transposition (42) of the real and imaginary components into baseband is performed and represented 420 in FIG. 4B in accordance with the equation:

$$y(k \cdot Te) = \sum_{n=0}^{N-1} \cos(k \cdot \pi) \cdot X_n \cdot e^{2 \cdot j \cdot \pi \cdot \frac{n}{N} k}$$

Next, an oversampling (43) by a factor L, with for example L=2, and at a frequency therefore equal to 2·Fe, of the real and imaginary components in baseband is implemented in accordance with the following equation:

$$y\left(l \cdot \frac{Te}{2}\right) = \sum_{n=0}^{N-1} \cos\left(l \cdot \frac{\pi}{2}\right) \cdot X_n \cdot e^{2 \cdot j \cdot \pi \cdot \frac{n}{N} \cdot l}$$

with $t = l \cdot Te/2$ and $0 < l < J = LN = 2 \cdot N$ which includes the zero insertion one sample in every two as represented (430) in FIG. 4B.

A low-pass filter (44) of the real and imaginary components is then performed to retain only the baseband signal (440) according to the equation:

$$z\left(l \cdot \frac{Te}{2}\right) = \frac{1}{2} \sum_{n=0}^{N-1} X_n \cdot e^{j \cdot \pi \cdot l\left(\frac{n}{N} - \frac{1}{2}\right)}$$

Then, a modulation (45) of the components at a carrier frequency equal to Fe/2 is implemented as represented (450) by FIG. 4B and in accordance with the following equation:

$$p\left(l \cdot \frac{Te}{2}\right) \cdot z\left(l \cdot \frac{Te}{2}\right) = \frac{1}{2} \cdot \sum_{n=0}^{N-1} X_n \cdot e^{j \cdot \pi \cdot l\left(\frac{n}{N} - \frac{1}{2} + \frac{1}{2}\right)} = \frac{1}{2} \cdot x\left(l \cdot \frac{Te}{2}\right)$$

It should be noted that, generally, the first and last carriers of an OFDM block are not modulated in order to avoid problems of overlapping of the frequency spectrum associated with each OFDM block; only M carriers are therefore actually mapped with M≤N, M being an integer. It is also possible to consider that these carriers form part of the so-called reserved carriers for which no correction is applied and, in this case, to more simply take M=N.

The signal $$z\left(l \cdot \frac{Te}{2}\right)$$

modulated at a carrier frequency equal to Fe/2 is therefore equal to the output signal of an inverse fast Fourier transform oversampled at the frequency equal to 2·Fe and is represented (460) in FIG. 4B.

The expression $$s\left(l \cdot \frac{Te}{2}\right)$$

is finally obtained to within a factor:

$$s\left(l \cdot \frac{Te}{2}\right) = Re\left[x\left(l \cdot \frac{Te}{2}\right)\right] = \sum_{n=0}^{N-1} \left[A_n \cos\left(\pi \cdot l \cdot \frac{n}{N}\right) - B_n \sin\left(\pi \cdot l \cdot \frac{n}{N}\right)\right]$$

with $0 \leq l \leq 2 \cdot N$

This equation is hereinafter called "resultant equation" and represents the temporal signal which "would be" transmitted without correction at the output of the OFDM transmission device, for an OFDM block considered.

This expression exhibits properties of temporal symmetries (hermitian symmetry) illustrated by the following expression with $0 \leq p \leq N$:

$$\left[A_n \cos\left(\pi \cdot n \cdot \frac{2 \cdot N - p}{N}\right) - B_n \sin\left(\pi \cdot n \cdot \frac{2 \cdot N - p}{N}\right)\right] = \left[A_n \cos\left(\pi \cdot p \cdot \frac{n}{N}\right) + B_n \sin\left(\pi \cdot p \cdot \frac{n}{N}\right)\right]$$

Because of this, the series of the 2·N samples of the cosine components of the N carriers is even, whereas the series of the 2·N samples of the sine components of the N carriers is odd.

Furthermore, the expression of $$S\left(l \cdot \frac{Te}{2}\right)$$

also exhibits frequency symmetry properties illustrated by the following expression with $0 \leq q \leq N/2$:

$$\left[A_n \cos\left(\pi \cdot l \cdot \frac{N-q}{N}\right) - B_n \sin\left(\pi \cdot l \cdot \frac{N-q}{N}\right)\right] = \cos(\pi \cdot l) \cdot \left[A_n \cos\left(\pi \cdot l \cdot \frac{q}{N}\right) + B_n \sin\left(\pi \cdot l \cdot \frac{q}{N}\right)\right]$$

with the result that the components of the second half-series for $$\frac{N}{2} \leq N - q \leq N$$

of the N carriers can be deduced from the first (for $0 \leq q \leq N/2$) by performing the same operation as for exploiting the temporal symmetries and by inverting one complex temporal sample in every two.

Thus, the expression of the resultant signal $$S\left(l \cdot \frac{Te}{2}\right)$$

without correction is used subsequently as reference, and updated by correcting, carrier by carrier, the original values of the real and imaginary components (An, Bn) by means of new corrected values (A'n, B'n).

Obviously, a complex signal can be represented by its real and imaginary components in the form An+jBn or in the form $C_n e^{j\phi} = C_n \cos \phi + jC_n \sin \phi$.

In effect, as indicated previously, the object of the invention is to implement the "preconstruction" of, in other words obtain, a digital signal representative from the dynamic and peak values point of view of the analog signal at the output of the transmission device, in order words obtain an "image" of the analog signal at the output of the transmission device and correct, over time, carrier by carrier, each constellation symbol modulating a carrier in order to obtain a preconstructed and corrected signal for which the PAPR is reduced.

The transmission method 20, according to an embodiment of the invention illustrated by FIG. 2, making it possible to apply a correction of the modulation constellation in order to reduce the PAPR of the transmitted signal, comprises, for a current carrier of index n, n being an integer such that $0 \leq n \leq N-1$, a first step of generation 21 of J=L·N complex temporal samples associated with said current carrier of index n, with L being an integer $\geq 1$.

Then, the transmission method 20 according to the invention comprises, for a current carrier of index n, n being an integer such that $0 \leq n \leq N-1$, a second step of detection 22 of a maximum power peak out of a previously preconstructed set $E_n$. The set $E_n$ corresponds to the L·N preconstructed real temporal samples resulting from the accumulation of the L·N preconstructed real temporal samples previously associated with the n-1 carriers previously corrected when $n \geq 1$ and the L·N preconstructed real temporal samples associated with the carrier uncorrected when n=0.

In the case where n=0, it concerns the first carrier of the OFDM block, so there is no set of L·N preconstructed real temporal samples associated with a set of previously corrected carriers. Because of this, a default set $E_D$ of L·N preconstructed real temporal samples is used for the peak detection and thus E0=ED.

It can for example be a set of L·N zero preconstructed real temporal samples, and in this case no peak will be detected and the correction information will be zero.

According to another variant, it can be considered that this default set $E_D$ of L·N preconstructed real temporal samples corresponds to all the preconstructed real temporal samples associated with the uncorrected current carrier of index 0.

According to another alternative, it can be considered that this default set $E_D$ of L·N preconstructed real temporal samples corresponds to a predetermined set obtained for example according to a statistical model.

In the case where $n \geq 1$, for example n=5, the detection step (22) is performed among a set $E_5$ of L·N preconstructed real temporal samples resulting from the accumulation of all the L·N preconstructed real temporal samples associated with the preceding four carriers, previously corrected, namely the carriers of indexes 1, 2, 3 and 4 and of L·N preconstructed real temporal samples associated with the uncorrected carrier of index 0.

The method comprises a step of comparison 220 between the detected peak and the temporal sample with respect to the peak out of the L·N complex temporal samples associated with the current carrier of index n supplied by the generation step 21. The comparison step delivers a complex correction control information item (PoIn).

For example, out of the default set $E_D$ of preconstructed real temporal samples, the method detects a peak corresponding to the fourth real temporal sample. Then, the method compares (220) the sign (positive or negative) of this fourth real temporal sample of the default set $E_D$ of preconstructed real temporal samples with the fourth complex temporal sample of the complex temporal samples associated with the carrier of index 0 supplied by the generation step 21.

The comparison step 220 delivers a complex correction control information item POLn belonging to at least one of the following categories:

real, respectively imaginary, part complex correction control information item, positive when the sign of the peak (that is to say the sign of its complex coordinates) and of the real, respectively imaginary, part of the corresponding complex temporal sample are identical, real, respectively imaginary, part complex correction control information item, negative when the sign of the peak and of the real, respectively imaginary, part of the corresponding complex temporal sample are opposite, real, respectively imaginary, part complex correction control information item, zero when the power amplitude of the temporal sample of the detected peak is below a predetermined threshold, or when said current carrier of index n is said to be "reserved" and should not be corrected.

In effect, it is possible for certain carriers such as the pilot carriers or the unmapped carriers at the edges of the spectrum not to be corrected in order to keep the respectively constant or zero associated mapping values intact. This therefore applies in particular for the pilot carriers when the insertion takes place before the PAPR reduction method according to the invention.

Then, the transmission method 20 according to the invention comprises, for a current carrier of index n modulated by a constellation symbol Xn, n being an integer such that $0 \leq n \leq N-1$, a third step of correction 23 of the constellation symbol Xn modulating said current carrier of index n as a function of the complex correction control information item. The correction step delivers a corrected current carrier of index n associated with a set of L·N corrected complex temporal samples.

More specifically, the control information item makes it possible to select a complex displacement of the constellation symbol on the X and Y axes of the complex plane of the constellation of the symbol out of three displacement possibilities for each real or imaginary part of the complex displacement. In effect, the complex displacement imposes a real (respectively imaginary) displacement that is negative (NEG) when the complex correction control information item comprises a positive real (respectively imaginary) part. The complex displacement imposes a real (respectively imaginary) displacement that is positive (POS) when the correction control information item comprises a negative real (respectively imaginary) part. The complex displacement imposes a real (respectively imaginary) displacement that is zero (ZERO) when the correction control information item comprises a real (respectively imaginary) part (which amounts to an absence of correction).

The complex correction displacement according to its two coordinates is therefore performed in the reverse direction of the formation of the PAPR peaks.

Once the complex displacement is selected as a function of the complex correction control information item, a summing of the coordinates (An, Bn) of the constellation symbol Xn with the coordinates (dAn, dBn) of the selected complex displacement do is performed. The correction step delivers the new coordinates (A'n, B'n) of the corresponding corrected constellation symbol X'n.

Furthermore, according to an embodiment of the invention, and in order to limit the complexity of implementation, the absolute value of the complex displacement is set from one carrier to another of said OFDM block and corresponds to a predetermined value, for example a value lying between 0.25 and 0.5 times the distance between the constellation point and the boundary of the decision sector.

Then, the transmission method 20 according to the invention comprises, for a current carrier of index n, n being an integer such that $0 \leq n \leq N-1$, a fourth step of construction (24) of the L·N preconstructed real temporal samples associated with the corrected current carrier of index n therefore modulated by X'n.

Then, the transmission method 20 according to the invention comprises, for a current carrier of index n, n being an integer such that $0 \leq n \leq N-1$, a fifth step of accumulation 25. This accumulation step associates, two by two, the L·N preconstructed real temporal samples associated with the corrected current carrier of index n with the set of L·N preconstructed real temporal samples resulting from the accumulation of the L·N preconstructed real temporal samples associated with the n−1 preceding carriers, previously corrected when $n \geq 1$, and of the L·N preconstructed real temporal samples associated with the uncorrected carrier for n=0.

6.2.2 Physical Implementation of the Different Steps of the Method According to the Invention The values (An,Bn) define a constellation symbol Xn (Xn=An+j·Bn). Compared to a conventional chain which generates a signal S(t) from the series of the values (An,Bn) transformed by an OFDM modulation (IFFT) as represented at the top of FIG. 3, the method according to the invention generates corrected values (A'n,B'n) which give, after OFDM modulation (IFFT), a signal S'(t) in which the PAPR peaks which affect S(t) have been attenuated.

For this, as described previously, the method according to the invention progressively preconstructs, by accumulation and simultaneously, the complex temporal samples of the signal S'(l·Te/2) over the duration of an OFDM block as defined in accordance with the "resultant" equation mentioned previously. In other words, the expression of the resultant signal $$S\left(l \cdot \frac{Te}{2}\right)$$

without correction according to the "resultant" equation mentioned previously is used subsequently as reference, and updated by correcting, carrier by carrier, the original values of the real and imaginary components (An, Bn) by means of the new corrected values (A'n, B'n).

During this "pre-construction", the algorithm eliminates the signal peaks as and when they form by detecting them and then by orienting the correction of constellation of the symbols Xn+1 arriving in the reverse direction of the formation of these peaks.

In accordance with the diagram of FIG. 3, the implementation of the method according to an embodiment of the invention comprises six processing modules, from 301 to 306, as described hereinbelow.

More specifically, the correction module 301 receives as input, in succession and in pace with the clock, the values of conventional constellation coordinates (that is to say without correction deriving from the modulation constellation applied previously 103 for example according to a QAM modulation) according to two components (or coordinates) An and Bn per OFDM block. The correction module determines three complex displacement possibilities (POS, ZERO, NEG), for each of the two components which will have the effect of modifying the coordinates of the current constellation symbol Xn.

The method according to the invention therefore makes it possible to select a complex displacement solution pair (dAn,dBn) to correct a constellation symbol Xn, with three possibilities. By addition with the original components An and Bn, a new pair (A'n,B'n) is obtained after correction 23. This new pair, applied as input for the IFFT (OFDM modulation 106) in relation to FIG. 1A, participates in the generation of the signal S'(t). This new pair will also be reintroduced into the algorithm to re-update the series of the J=L·N=2·N preconstructed real temporal samples (N=FFT size=IFFT size) of the real temporal response currently being preconstructed which would be obtained after IFFT and modulation, in accordance with the "resultant" equation, mentioned previously, implemented by the construction module 306 and by the accumulation module 305.

As described above, operations are performed between the L·N preconstructed real temporal samples resulting from the accumulation of the L·N preconstructed real temporal samples associated with the n−1 preceding carriers, previously corrected when n≥1 and, of the L·N preconstructed real temporal samples associated with the carrier not corrected for n=0, and all the complex temporal samples corresponding to the cosine and sine components of the current carrier considered of index n which are stored in ROM memory or else computed algorithmically by the module 302 for generating a multicarrier signal. The module 302 for generating a multicarrier signal therefore delivers, for each constellation symbol Xn considered, the series of the J=L·N=2·N cosine and sine complex temporal samples of the carrier n with which it is associated in the OFDM block of size N. The module 302 therefore constructs 21 the L·N complex temporal samples of each carrier n.

On each clock pulse, all the complex temporal samples of the signal S'(I·Te/2) are thus preconstructed progressively by accumulating 25 in the accumulation module 305 the current result according to the equation mentioned above, with the different results of the correction operations previously performed.

For example, the complex temporal samples corresponding to the cosine and sine components of the carrier of index n constitute the elements of the vectors $COS_n[\ ]$ and $SIN_n[\ ]$ defined as follows:

$$COS_n[\ ] = \begin{bmatrix} \cos\left(\pi \cdot \frac{n}{N}\right) \\ \cos\left(2 \cdot \pi \cdot \frac{n}{N}\right) \\ \ldots \\ \ldots \\ \cos\left((2 \cdot N - 2) \cdot \pi \cdot \frac{n}{N}\right) \\ \cos\left((2 \cdot N - 1) \cdot \pi \cdot \frac{n}{N}\right) \end{bmatrix}$$

$$SIN_n[\ ] = \begin{bmatrix} \sin\left(\pi \cdot \frac{n}{N}\right) \\ \sin\left(2 \cdot \pi \cdot \frac{n}{N}\right) \\ \ldots \\ \ldots \\ \sin\left((2 \cdot N - 2) \cdot \pi \cdot \frac{n}{N}\right) \\ \sin\left((2 \cdot N - 1) \cdot \pi \cdot \frac{n}{N}\right) \end{bmatrix}$$

A signal vector S'n[ ] is therefore obtained resulting from the accumulation 25 by the accumulation module 305 of the L·N=2·N real temporal samples constructed in the module 306 associated with the n−1 preceding carriers, previously corrected, when n≥1 and the 2·N constructed real temporal samples associated with the carrier not corrected for n=0.

The signal vector S'n[ ] is then used as input for a module 304 for detecting a peak PEAKn, which, with the index n, is expressed as follows:

$$S'_n[\ ] <= S'_{n-1}[\ ] + A'_{n-1} \cdot COS_{n-1}[\ ] - B'_{n-1} \cdot SIN_{n-1}[\ ]\ ]0 < n < N$$

and with, for example, $S'_0[\ ] = 0$.

Since the accumulation module 305 is registered, the operator "<=" of the above equation means that the left term which corresponds to the output of the accumulation module 305 will conform to the right term one clock cycle later.

Thus, there is obtained, with the index n, an intermediate value S'n[ ] of the vector of the J=L·N=2·N preconstructed real temporal samples representative of S'(I·Te/2) at the output of the registered accumulation module 305, when the series of the constellation symbols has arrived at the symbol Xn of index n.

According to one embodiment, when n=N−1 then $S'_{N-1}[\ ]$ contains the constructed real temporal samples of S'(I·Te/2) for the N carriers of the OFDM block considered, except for a last value which is disregarded, and the accumulation module 305 will, for example, be reset to zero for a new OFDM block.

On each clock pulse Clk representing the rate of processing from one carrier to another, in accordance with the "resultant" equation, mentioned previously, J=L·N=2·N results are loaded into the accumulation module 305. In parallel, the complex temporal samples of the cosine and sine components supplied by the module 302 for generating a multicarrier signal, which previously were at the index n−1, are replaced by those associated with the carrier of index n which will subsequently be modulated by the constellation symbol X'n, that is Xn characterized by a new pair of corrected values of its coordinates (A'n, B'n).

From the output of the accumulation block 305, a module 304 for detecting a peak PEAKn then makes it possible to detect, 22, the possible appearance of a signal peak by searching for the real temporal sample of maximum amplitude out of the 2·N preconstructed real temporal samples of the signal vector S'n[ ] resulting from the accumulation of all the 2·N preconstructed real temporal samples associated with the n−1 preceding carriers, previously corrected when n≥1 and the 2·N real temporal samples associated with the carrier not corrected for n=0. This real temporal sample is determined by the following equation:

$$PEAK_n = \max_{0 \le l < 2 \cdot N}(S'_n(l)).$$

The detection module 304 then supplies the information relating to the detected peak to a comparison module 303 which will determine 220 whether the cosine and sine complex temporal samples of the current carrier with the index n corresponding to the peak have a complex polarity POLn=POLAn+j·POLBn coinciding with the detected peak. This polarity is subsequently used as a complex correction control information item. For example, POLn is defined by: $POL_n = [Sgn(COS_n(l_{peak})) - j \cdot Sgn(SIN_n(l_{peak}))] \cdot Sgn(PEAK_n)$. If the polarities between the cosine (−sin e) component of the complex temporal sample and the detected peak are identical then POLAn (POLBn) is positive and a correction by negative (NEG) complex displacement dAn (dBn) is chosen. Conversely, if the polarities are opposite, then POLAn (POLBn) is negative and a correction by positive complex displacement dAn (dBn) is selected to obtain A'n and B'n, the corrected components of the constellation symbol Xn.

In the case where the amplitude of the cosine (or sine) component of the complex temporal sample coinciding with the detected peak is too small relative to a certain threshold Pseuil (corresponding to a threshold amplitude of POLn) and will not provide any significant reduction of the peak, then the ZERO real (respectively imaginary) displacement of the complex displacement, that is to say without correction, is applied.

If the correction cannot be sufficiently effective, it is preferable to make no modification to the constellation symbol considered. In effect, in this case, a modification can degrade the bit error rate or pointlessly increase the average power by a complex displacement within the original constellation.

By contrast, in the case of the TR technique described in relation to the prior art, the threshold Pseuil is not necessary since a pilot carrier will not add any disturbance of the useful signal regardless of the correction effectiveness which will be obtained.

The peak detection module 304 therefore supplies the position of the real temporal sample which exhibits a peak level and its sign. The table below summarizes, for the component An (Bn), the direction of complex displacement which will be provided as a function of the sign of $COS_n$ ($l_{peak}$), respectively ($-SIN_n(l_{peak})$), for a value Pseuil corresponding to a threshold amplitude of POLn lying in practice between 0.15 and 0.3.

| $COS_n(l_{peak})$ ($-SIN_n(l_{peak})$) | Value Sign | Detected peak | Value Sign | Direction of complex displacement (dAn, dBn) |
|---|---|---|---|---|
| >Pseuil | +1 | 1 | +1 | Negative |
|  | +1 | 1 | -1 | Positive |
| -Pseuil < < Pseuil | — | 1 | +1 | Zero |
|  | — | 1 | -1 | Zero |
| <-Pseuil | -1 | 1 | +1 | Positive |
|  | -1 | 1 | -1 | Negative |
| Absence of peak level | — | 0 | — | Zero |

If the aim is to displace the constellation symbols while remaining within the original constellation, a positive real displacement dAn (imaginary displacement dBn) for An (Bn) is reflected in a real displacement to the right (respectively imaginary displacement upwards) of the constellation point on the complex plane and, conversely, to the left (downwards) for a negative real (imaginary) displacement.

On the contrary, if the aim is to displace the constellation symbols out of the original constellation such as in the TI-CES technique, a point is displaced to an opposite point of the extended constellation only if the sign of the component An (Bn) is contrary to that of the direction of real displacement dAn (imaginary displacement dBn), positive or negative, chosen as a function of the polarity POLAn (POLBn); otherwise there is no modification of the point.

6.2.3 Results of the Method According to the Invention 80 to 90% of the signal peaks leading to a strong PAPR can be taken up by means of the method described previously.

Nevertheless, it should be noted that certain signal peaks appear very late in the formation of the OFDM block and can be corrected only partially by the method according to the invention when the latter has only a fairly limited power of correction from carrier to carrier.

Because of this, to obtain an efficient correction, the PAPR peaks of the signal have to occur early enough in the "preconstruction" process to be then effectively corrected, or else it is necessary to displace the constellation symbols out of the original constellation as in the CES method.

Conversely, when processing the first carriers, very few high peak levels are distinguished and the correction capacity of the method is underemployed.

Furthermore, it should be noted that it is possible to combine the method according to the invention with the fairly simple "clipping" or limiting technique previously described in relation to the prior art in order to increase the reduction of the PAPR.

6.3 Description of Examples of New Constellations Obtained According to the Invention.

As for the TI-CES, CD, ACE and TR techniques of the prior art, the method according to the invention culminates in a modification of the modulation constellation of the carriers in the frequency domain before IFFT, to then obtain, in the time domain, a signal with reduced PAPR.

The advantage of the method according to the invention is the constellation correction flexibility. In effect, any type of correction can be applied according to the invention, provided that the latter can be reflected in a controlled complex displacement of the real and/or imaginary components of the constellation symbol associated with a carrier.

Thus, the displacements in the positive or negative direction on the X and Y axes of the complex plane can lead to constellation points being kept in their decision sector or in the original constellation or else in them being displaced out.

Figure 5A:
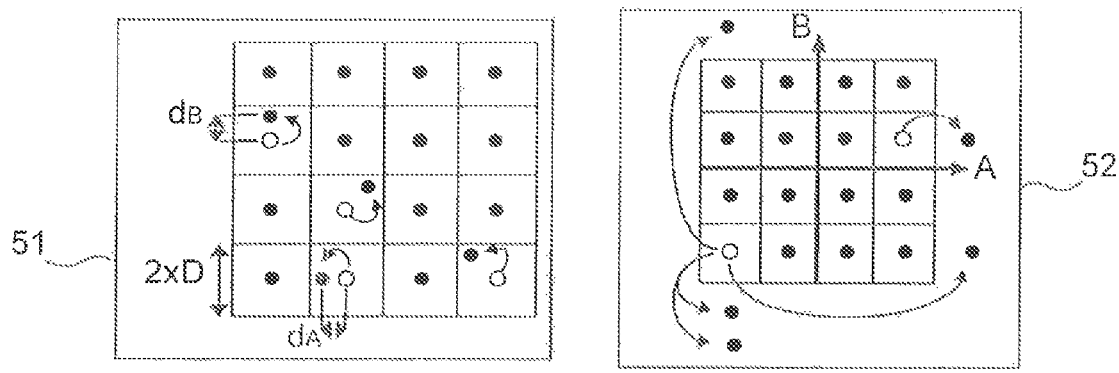
FIGS. 5A to 5C illustrate different examples of corrected constellations obtained according to the invention.

In relation to FIG. 5A, the method according to the invention makes it possible to apply complex displacements equally inside (51) and outside (52) the original constellation.

Because of this, the implementation of the method according to the invention delivers two new more general constellation correction classes:

class 51 ICS (Inside Constellation Shift) for which, when the applied modification remains moderate, the displaced constellation points remain inscribed within the original constellation, this class notably partly including the CD technique of the prior art described previously, and the class 52 OCS (Outside Constellation Shift) for which the points are displaced out of the original constellation, this class including the TI-CES and ACE techniques of the prior art described previously.

With respect to the TR technique (from the prior art described previously, there is no concept of constellation, the constellation of the peak reduction pilot (PRT) carriers being defined only in order to reduce the PAPR, which can also be controlled by the method according to the invention.

The constellation correction implemented according to the invention can therefore replace any of the constellation corrections of the prior art PAPR reduction techniques described previously, by adopting therein, for each of them taken separately, all the advantages or not.

One advantage of the proposed system is then to be able to gain more effectiveness by making it possible to associate a number of techniques, the distinct respective defects of which can to a certain extent be neutralized.

Figure 5B:
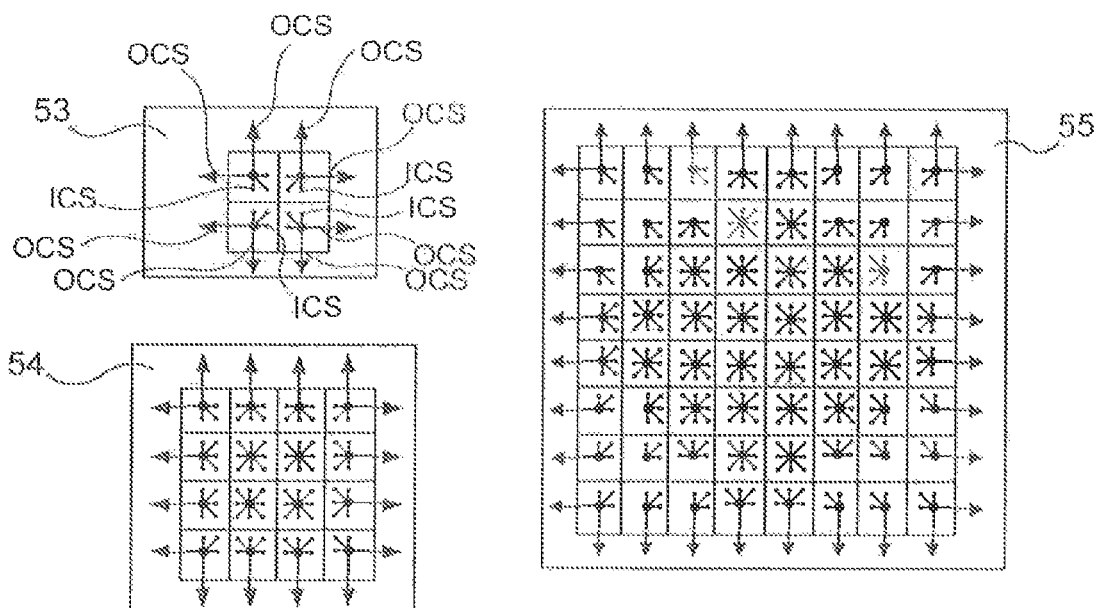

FIG. 5B represents, by way of example, all the complex displacements allowed for the QPSK (53), QAM16 (54), QAM64 (55) constellations resulting from an original combination of so-called ICS constellation corrections (small arrows toward the inside) for which the displaced constellation points remain inscribed within the modified original constellation and of so-called OCS constellation corrections (large arrows outwards) for which the points are displaced out of the original constellation.

Figure 5C:
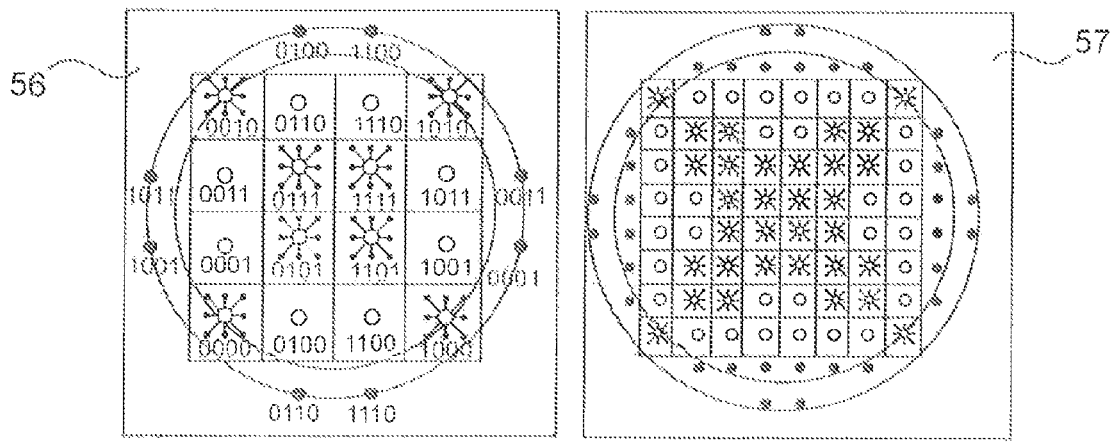

Similarly, FIG. 5C shows two constellations QAM16 (56) and QAM64 (57) comprising both ICS or OCS complex displacements. For the conventional points affected by the complex displacement out of the original constellation, two opposite correction solutions relative to one of the real or imaginary axes are possible, the original white point and a black point "extended" outwards.

The number, and the positions of the new "extended" black points are determined in such a way that the increase in average power of the constellation remains limited (constellation inscribed at best within a circle) but nevertheless with a proportion of points displaced outwards from the original constellation by the order of a third or a half relative to the points displaced toward the inside of the original constellation so as to retain a good correction capacity in each case, QAM16 (56) and QAM64 (57).

Thus, the method according to the invention makes it possible to obtain two new constellation types, called "ICS" or "OCS" according to whether the constellation points are displaced respectively inwards or outwards from the original constellation, which combine the advantages of the different prior art techniques.

6.4 Description of the Transmission Device According to the Invention

Figure 6:
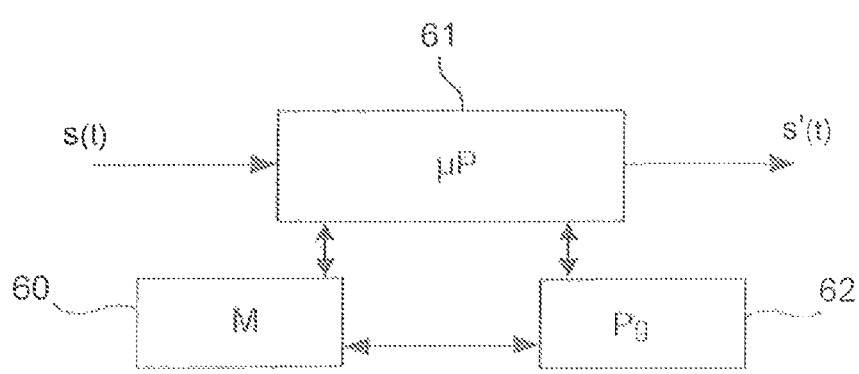
FIG. 6 illustrates the structure of a transmission device according to the invention.

The simplified structure of a device for transmitting an OFDM signal representative of a source OFDM signal comprising OFDM blocks each comprising a set of N carriers implementing a transmission technique according to the invention is presented in relation to FIG. 6.

Such a transmission device comprises a storage module 60 comprising a buffer memory M, a processing unit 61, equipped for example with a microprocessor μP, and driven by the computer program 62, implementing the transmission method according to the invention.

On initialization, the code instructions of the computer program 62 are for example loaded into a RAM memory M before being executed by the processor of the processing unit 61. The processing unit 61 receives as input complex symbols Xn onto which data representative of a source signal have been mapped. The microprocessor of the processing unit 61 implements the steps of the transmission method described previously, according to the instructions of the computer program 62, to perform a correction of the modulation constellation aiming to reduce the PAPR of the transmitted signal S'(t). For this, the transmission device comprises:

a mapping module for mapping the data representative of the source signal on the complex symbols Xn, 0≤n<M, belonging to a constellation, n and M being integers, a transformation module for transforming M symbols Xn into M corrected symbols X'n, such that X'n=Xn+dn, with dn being a complex correction, an OFDM modulator with N carriers for generating the OFDM signal from the M corrected symbols X'n mapped on M carriers, with M≤N, N being an integer.

The transformation module comprises:

a construction and accumulation module for accumulating J temporal samples corresponding to the J samples of the carrier of order n mapped by X'n to J samples already present, J being an integer, J>0.

a module for detecting a peak on the J samples at the output of the construction and accumulation module to the order n−1 and for comparing this peak with the coinciding temporal sample out of J temporal samples of the carrier of order n delivering a complex correction control information item, a correction module determining the complex correction value dn to obtain the corrected symbol X'n as a function of the complex correction control information item.

According to one embodiment, the construction and accumulation module comprises:

a module for constructing the J temporal samples of the current carrier of order n mapped by X'n and an accumulation module, and the transformation module further comprises:

a module for generating the J complex temporal samples associated with said current carrier of index n, J being an integer.

These means are driven by the microprocessor of the processing unit 61.

An embodiment of the present disclosure proposes a novel solution which does not exhibit all these drawbacks of the prior art, in the form of a method for transmitting an OFDM signal.

Although the present disclosure has been described with reference to one or more examples, workers skilled in the art will recognize that changes may be made in form and detail without departing from the scope of the disclosure and/or the appended claims.

The invention claimed is:

1. A method for transmitting a temporal OFDM signal generated from OFDM blocks modulated by an OFDM modulator of N carriers, comprising a processing before transmission, which comprises for an OFDM block of the OFDM blocks:

a mapping of data representative of a source signal on complex symbols Xn, 0≤n<M, belonging to a constellation, n and M being integers, a transformation of M symbols Xn into M corrected symbols X'n, such that X'n=Xn+dn, with dn being a complex correction, with X'0=X0, such that the transformation comprises for the OFDM block:

initialization of an accumulator with LN temporal samples, L≥1 and being an oversampling factor, and comprises, for each carrier of order n in the range of 1 to M−1:

detection of a peak on the LN temporal samples present in the accumulator and comparison of this peak with a coinciding temporal sample out of LN temporal samples of the carrier of order n delivering a complex correction control information item, a correction determining the complex correction value do to obtain the corrected symbol X'n as a function of the complex correction control information item, and accumulation in the accumulator respectively with the LN temporal samples present of LN temporal samples corresponding to LN temporal samples of the carrier of order n mapped by X'n, and the method comprises for the OFDM block:

a mapping of the M corrected symbols X'n on M out of the N carriers of the OFDM modulator to generate the OFDM temporal signal, N being an integer, M≤N, and transmitting the OFDM temporal signal at a reduced peak-to-average power ratio.

2. The transmission method as claimed in claim 1, further comprising generation of LN temporal samples associated with a current carrier of order n and in which the detection and the comparison is implemented in relation to the generation of the LN temporal samples of the current carrier of order n, with a delay of determined duration corresponding to a clock cycle.

3. The transmission method as claimed in claim 1, in which, for a current carrier of order n, the detected peak is a power peak, the LN temporal samples of the current carrier are complex composed of real and imaginary parts and in which the complex correction control information item is composed of real and imaginary parts and belongs to at least one of the following categories:

the respective real part and imaginary part of the complex correction control information item, is positive when the sign of the detected peak and of the respective real part and imaginary part of the coinciding complex temporal sample are identical, the respective real part and, imaginary part of the complex correction control information item, is negative when the sign of the detected peak and of the respectively real part and imaginary part of the coinciding complex temporal sample are opposite, the respective real part and imaginary part of the complex correction control information item, is zero when power amplitude of the detected peak is below a predetermined threshold, or when said current carrier of order n is said to be "reserved" and should not be corrected.

4. The transmission method as claimed in claim 1, in which the correction implements a summing of the coordinates of the constellation symbol Xn with a complex displacement of the constellation symbol on the X and Y axes of the complex plane of the constellation of the symbol, the complex displacement composed of real and imaginary parts being selected by using the complex correction control information item composed of real and imaginary parts out of the complex displacement belonging to at least one of the following categories:

the respective real part and imaginary part of the complex displacement is negative when the respective real part and imaginary part of the complex correction control information item is positive;

the respective real part and imaginary part of the complex displacement is positive when the respective real part and imaginary part of the complex correction control information item is negative;

the respective real part and imaginary part of the complex displacement is zero when the respective real part and imaginary part of the complex correction control information item is zero.

5. The transmission method as claimed in claim 4, wherein each of the absolute values of the real part and of the, imaginary part of the complex displacement is fixed from one carrier to another of said OFDM block and said each absolute value corresponds to a predetermined value.

6. The transmission method as claimed in claim 1, in which the transformation implements a discrete inverse Fourier transform computed carrier after carrier with, for a given carrier n mapped by X'n, a computation of the LN samples to be accumulated.

7. The transmission method as claimed in claim 1, wherein said transmission method implements the following equation, for L=2:

$$S\left(l \cdot \frac{Te}{2}\right) = \sum_{n=0}^{M-1} \left[ A'_n \cos\left(\pi \cdot l \cdot \frac{n}{N}\right) - B'_n \sin\left(\pi \cdot l \cdot \frac{n}{N}\right) \right]$$

with:

A'n and B'n being real and imaginary parts of the symbol X'n modulating a current carrier of index n, S being a real part of the 2·N temporal samples in the accumulator after accumulation at the order n=M−1 relating to an OFDM block, Te being the sampling period and 0≤l<N·L=2·N.

8. A device for transmitting a temporal OFDM signal, wherein the device comprises:

a mapper to map data representative of a source signal on complex symbols Xn, 0≤n<M, belonging to a constellation, n and M being integers, a transformation module configured to transform M symbols Xn into M corrected symbols X'n, such that X'n=Xn+dn, with dn being a complex correction and X'0=X0, an OFDM modulator with N carriers to generate the temporal OFDM signal from the M corrected symbols X'n mapped on the N carriers, N being an integer, M≤N, a transmitter to transmit the OFDM temporal signal at a reduced peak-to-average power ratio, the transformation module comprising:

a construction and accumulation module configured to accumulate LN temporal samples corresponding to LN temporal samples of a carrier of order n, for each carrier of order n in the range of 1 to M−1, mapped by X'n to LN samples already present from an initialization, L≥1 and being an oversampling factor, a module configured to detect a peak on the LN samples at the output of the construction and accumulation module to the order n−1 and compare this peak with a coinciding temporal sample out of the LN temporal samples of the carrier of order n delivering a complex correction control information item, a correction module configured to determine the complex correction value dn to obtain the corrected symbol X'n as a function of the complex correction control information item.

9. The device for transmitting an OFDM signal as claimed in claim 8, such that the construction and accumulation module comprises:

a module configured to generate the LN temporal samples of the current carrier of order n and an accumulation module.

10. A non-transitory computer-readable information medium comprising program instructions stored thereon suitable for transmitting a temporal OFDM signal generated from OFDM blocks modulated by an OFDM modulator of N carriers and implementing the following acts for an OFDM block of the OFDM blocks when said program is loaded and executed in an OFDM transmission device:

mapping of data representative of a source signal on complex symbols Xn, 0≤n<M, belonging to a constellation, n and M being integers, transformation of M symbols Xn into M corrected symbols X'n, such that X'n=Xn+dn, with dn being a complex correction and with X'0=X0, such that the transformation comprises for the OFDM block:

initialization of an accumulator with LN samples, L≥1 and being an oversampling factor, and comprises for each carrier of order n in the range of 1 to M−1:

detection of a peak on the LN samples present in the accumulator and comparison of this peak with a coinciding temporal sample out of LN temporal samples of the carrier of order n delivering a complex correction control information item, correction determining the complex correction value dn to obtain the corrected symbol X'n as a function of the complex correction control information item, and accumulation in the accumulator respectively with the LN samples present of LN temporal samples corresponding to the LN temporal samples of the carrier of order n mapped by X'n, and for the OFDM block, of a mapping of the M corrected symbols X'n on the N carriers of the OFDM modulator to generate the temporal OFDM signal, N being an integer, M≤N, and transmitting the OFDM temporal signal at a reduced peak-to-average power ratio.

* * * * *

UNITED STATES PATENT AND TRADEMARK OFFICE
CERTIFICATE OF CORRECTION

PATENT NO. : 9,455,858 B2
APPLICATION NO. : 14/433838
DATED : September 27, 2016
INVENTOR(S) : Marc Lanoiselee et al.

Page 1 of 1

It is certified that error appears in the above-identified patent and that said Letters Patent is hereby corrected as shown below:

In the Claims

In Claim 1:
Column 24, Line 48; delete "do" and insert --dn--.

Signed and Sealed this
Seventeenth Day of April, 2018

Andrei Iancu
*Director of the United States Patent and Trademark Office*